US012182967B2

United States Patent
Chen et al.

(10) Patent No.: US 12,182,967 B2
(45) Date of Patent: Dec. 31, 2024

(54) SUPER-RESOLUTION USING NATURAL HANDHELD-MOTION APPLIED TO A USER DEVICE

(71) Applicant: Google LLC, Mountain View, CA (US)

(72) Inventors: Yi Hung Chen, Taipei (TW); Chia-Kai Liang, San Jose, CA (US); Bartlomiej Maciej Wronski, San Francisco, CA (US); Peyman Milanfar, Menlo Park, CA (US); Ignacio Garcia Dorado, Mountain View, CA (US)

(73) Assignee: Google LLC, Mountain View, CA (US)

( * ) Notice: Subject to any disclaimer, the term of this patent is extended or adjusted under 35 U.S.C. 154(b) by 484 days.

(21) Appl. No.: 17/263,814

(22) PCT Filed: Aug. 6, 2019

(86) PCT No.: PCT/US2019/045342
§ 371 (c)(1),
(2) Date: Jan. 27, 2021

(87) PCT Pub. No.: WO2020/033432
PCT Pub. Date: Feb. 13, 2020

(65) Prior Publication Data
US 2021/0304359 A1 Sep. 30, 2021

Related U.S. Application Data

(60) Provisional application No. 62/716,921, filed on Aug. 9, 2018.

(51) Int. Cl.
*G06T 3/40* (2024.01)
*G06N 7/01* (2023.01)
(Continued)

(52) U.S. Cl.
CPC ............. *G06T 3/4053* (2013.01); *G06N 7/01* (2023.01); *G06T 5/50* (2013.01); *G06T 7/337* (2017.01);
(Continued)

(58) Field of Classification Search
CPC ......... G06T 3/4053; G06T 5/50; G06T 7/337; G06T 2207/10024; G06T 2207/20024;
(Continued)

(56) References Cited

U.S. PATENT DOCUMENTS 6,771,304 B1    8/2004   Mancuso et al.
7,941,004 B2    5/2011   Zhu et al.
(Continued)

FOREIGN PATENT DOCUMENTS

CN    106357957    1/2017
CN    107040708    8/2017
(Continued)

OTHER PUBLICATIONS

Nasrollahi et al., "Super-resolution: a comprehensive survey" (Year: 2014).*

(Continued)

*Primary Examiner* — Mekonen T Bekele
(74) *Attorney, Agent, or Firm* — McDonnell Boehnen Hulbert & Berghoff LLP

(57) ABSTRACT

The present disclosure describes systems and techniques for creating a super-resolution image (122) of a scene captured by a user device (102). Natural handheld motion (110) introduces, across multiple frames (204, 206, 208) of an image of a scene, sub-pixel offsets that enable the use of super-resolution computations (210) to form color planes (212, 214, 216), which are accumulated (218) and combined (220) to create a super-resolution image (122) of the scene.

20 Claims, 6 Drawing Sheets

(51) Int. Cl.
G06T 3/4053 (2024.01)
G06T 5/50 (2006.01)
G06T 7/33 (2017.01)

(52) U.S. Cl.
CPC .............. *G06T 2207/10024* (2013.01); *G06T 2207/20024* (2013.01); *G06T 2207/20076* (2013.01)

(58) Field of Classification Search
CPC . G06T 2207/20076; G06T 2207/20201; G06T 2207/20221; G06T 3/4069; G06T 1/20; G06T 7/30; G06N 7/01
See application file for complete search history.

(56) References Cited

U.S. PATENT DOCUMENTS

| | | | |
|---|---|---|---|
| 8,306,121 | B2 | 11/2012 | Jia |
| 8,587,696 | B2 | 11/2013 | Georgis et al. |
| 8,594,464 | B2 | 11/2013 | Liu |
| 8,630,484 | B2 | 1/2014 | Ozluturk |
| 9,124,797 | B2 | 9/2015 | Guenter |
| 9,262,813 | B2 | 2/2016 | Kotani |
| 9,288,395 | B2 | 3/2016 | Baer et al. |
| 9,426,362 | B2 | 8/2016 | Tang et al. |
| 11,611,697 | B2 | 3/2023 | Chen et al. |
| 2006/0139473 | A1 | 6/2006 | Shin |
| 2011/0102606 | A1 | 5/2011 | Toyomura |
| 2012/0069238 | A1 | 3/2012 | Toyomura |
| 2014/0125825 | A1 | 5/2014 | Baer et al. |
| 2014/0375865 | A1 | 12/2014 | Shroff et al. |
| 2015/0169990 | A1* | 6/2015 | McLaughlin ......... G06T 3/4069 382/218 |
| 2015/0181194 | A1 | 6/2015 | Izawa et al. |
| 2016/0127650 | A1 | 5/2016 | Van Den Herik et al. |
| 2016/0212332 | A1 | 7/2016 | Tang et al. |
| 2017/0171456 | A1 | 6/2017 | Wei |
| 2017/0272655 | A1 | 9/2017 | Sakurai |
| 2021/0266519 | A1 | 8/2021 | Jang |
| 2021/0304359 | A1 | 9/2021 | Chen et al. |
| 2021/0374909 | A1 | 12/2021 | Chen et al. |

FOREIGN PATENT DOCUMENTS

| | | |
|---|---|---|
| JP | 2007057998 | 3/2007 |
| JP | 2016152602 | 8/2016 |
| KR | 20060075381 | 7/2006 |
| KR | 20120008062 | 1/2012 |
| KR | 20150014495 | 2/2015 |
| KR | 20180008588 | 1/2018 |
| WO | 2020033427 | 2/2020 |
| WO | 2020033432 | 2/2020 |

OTHER PUBLICATIONS

Rui et al.,, "Super-resolution reconstruction of astronomical images using time-scale adaptive normalized convolution", published 2018. (Year: 2018).*
Karch et al., , Robust super-resolution by fission interpolated frames for color and gray scale imaging', published 201 (Year: 2018).*
Karch et al., "Robust super-resolution by fission interpolated frames for color and gray scale imaging", published 2015, (Year: 2015).*
"Foreign Office Action", JP Application No. 2021-506479, Sep. 13, 2022, 11 pages.
"Notice of Allowance", U.S. Appl. No. 17/263,743, filed Nov. 14, 2022, 11 pages.
"Foreign Notice of Allowance", KR Application No. 10-2022-7041057, Dec. 9, 2022, 5 pages.
"Foreign Office Action", JP Application No. 2021-506479, May 10, 2022, 12 pages.
"Foreign Office Action", JP Application No. 2021-506477, May 10, 2022, 8 pages.
"Foreign Office Action", KR Application No. 10-2021-7003929, Jun. 29, 2022, 12 pages.
"Non-Final Office Action", U.S. Appl. No. 17/263,743, filed Aug. 3, 2022, 24 pages.
Park, et al., "Super-Resolution Image Reconstruction", May 2003, 16 pages.
"International Preliminary Report on Patentability", Application No. PCT/US2019/045334, Feb. 9, 2021, 10 pages.
"International Preliminary Report on Patentability", Application No. PCT/US2019/045342, Feb. 9, 2021, 13 pages.
"Foreign Office Action", CN Application No. 201980045299.3, Aug. 25, 2021, 15 pages.
"International Search Report and Written Opinion", PCT Application No. PCT/US2019/045342, Oct. 16, 2019, 20 pages.
"International Search Report and Written Opinion", PCT Application No. PCT/US2019/045334, Oct. 23, 2019, 17 pages.
Ben-Ezra, et al., "Jitter Camera: High Resolution Video from a Low Resolution Detector", 2018 IEEE/CVF Conference on Computer Vision and Pattern Recognition Workshops, 2018, 17 pages.
Guo, et al., "Super-Resolution Reconstruction of Astronomical Images Using Time-Scale Adaptive Normalized Convolution", Chinese Society of Aeronautics and Astronautics & Beihang University, Jun. 21, 2018, 12 pages.
Karch, et al., "Robust Super-Resolution by Fusion of Interpolated Frames for Color and Grayscale Images", Frontiers in Physics, Apr. 24, 2015, 14 pages.
Li, et al., "Jittered Exposures for Image Super-Resolution", 2018 IEEE/CVF Conference on Computer Vision and Pattern Recognition Workshops, 2018, 8 pages.
Nasrollahi, et al., "Super-Resolution: A Comprehensive Survey", Machine Vision and Applications (2014) 25:1423-1468, Jun. 14, 2014, 46 pages.
Wronski, et al., "Handheld Multi-Frame Super-Resolution", ACM Transactions on Graphics, vol. 38, No. 4, Jul. 12, 2019, Jul. 12, 2019, 18 pages.
"Foreign Office Action", IN Application No. 202147005282, Jan. 11, 2022, 6 pages.
"Foreign Office Action", IN Application No. 202147005283, Jan. 12, 2022, 10 pages.
"Foreign Office Action", KR Application No. 10-2021-7003928, Feb. 21, 2022, 13 pages.

* cited by examiner

SUPER-RESOLUTION USING NATURAL HANDHELD-MOTION APPLIED TO A USER DEVICE

BACKGROUND

In conjunction with capturing a scene, a user device, such as a mobile phone, creates an image of the scene that is often lower in resolution than an image of the scene captured and rendered by other devices, such as digital single-lens reflex (DSLR) camera. Images captured by these user devices may also be noisy and have lower dynamic range because of the relatively small physical sensor size permitted by these user devices limiting the user device camera's spatial resolution. The image sensor of the user device may also have smaller apertures, limiting the user device camera's light-gathering ability, and smaller pixels, reducing a signal-to-noise ratio that the smartphone uses to process a captured image.

Furthermore, the image sensor of the user device's camera often includes a color filter array (CFA), which traditionally requires digital image-processing hardware of the user device to use demosaicing techniques while rendering a captured image of a scene. Demosaicing techniques, in general, are detrimental to super-resolution rendering. Effects of demosaicing techniques can include chromatic aliasing, false gradients, and Moiré patterns that lead to the user device rendering, at a poor resolution and with non-desirable artifacts, the captured image of the scene.

SUMMARY

The present disclosure describes systems and techniques for creating a super-resolution image of a scene captured by a user device. Natural handheld motion introduces, across multiple frames of an image of a scene, sub-pixel offsets that enable the use of super-resolution computing techniques to form color planes, which are accumulated and merged to create a super-resolution image of the scene. These systems and techniques offer advantages over other systems and techniques that rely on demosaicing, providing the super-resolution image of the scene without detrimental artifacts, such as chromatic aliasing, false gradients, and Moiré patterns.

In some aspects, a method performed by a user device to render a super-resolution image of a scene is described. The method includes capturing, in a burst sequence, multiple frames of an image of a scene, where the multiple frames have respective, relative sub-pixel offsets of the image due to a motion of the user device during the capture of the multiple frames. The method includes using the captured, multiple frames to perform super-resolution computations that include computing Gaussian RBF kernels and computing a robustness model. The method further includes accumulating, based on the super-resolution computations, color planes, combining the accumulated color planes to create the super-resolution image of the scene, and rendering the super-resolution image of the scene.

In other aspects, a method for providing color planes to an apparatus is described. The method includes computing Gaussian radial basis function kernels, wherein computing the Gaussian radial basis function kernels includes (i) computing a reference frame and (ii) computing a kernel covariance matrix based on analyzing local gradient structure tensors, where the local gradient structure tensors correspond to edges, corners, or textured areas of content included in the reference frame.

The method also includes computing a robustness model, wherein computing the robustness model uses a statistical neighborhood model to compute a color mean and spatial standard deviation. Based on the computed Gaussian RBF kernels and the computed robustness model, the method includes determining the contribution of pixels to color planes and accumulating the color planes. The color planes are then provided to the apparatus.

In yet other aspects, a user device is described. The user device includes one or more processors, one or more image sensors, and a display. The user device also includes a computer-readable medium storing instructions of a super-resolution manager that, when executed by the one or more processors, directs the user device to capture, in a burst sequence, multiple frames of an image of a scene, where the multiple frames have respective, relative offsets of the image. The super-resolution manager also directs the user device to use the captured, multiple frames to perform super-resolution computations and accumulate planes based on the super-resolution computations, combine the accumulated planes to create the super-resolution image of the scene, and render the super-resolution image of the scene.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, a reader should not consider the summary to describe essential features nor limit the scope of the claimed subject matter.

BRIEF DESCRIPTION OF THE DRAWINGS

This present disclosure describes details of one or more aspects associated with creating a super-resolution image of a scene captured by a user device.

DETAILED DESCRIPTION

The present disclosure describes techniques and systems for creating a super-resolution image of a scene. While features and concepts of the described systems and methods for super-resolution using natural handheld motion applied to a user device can be implemented in any number of different environments, systems, devices, and/or various configurations, aspects are described in the context of the following example devices, systems, and configurations.

Example Operating Environment

Figure 1:
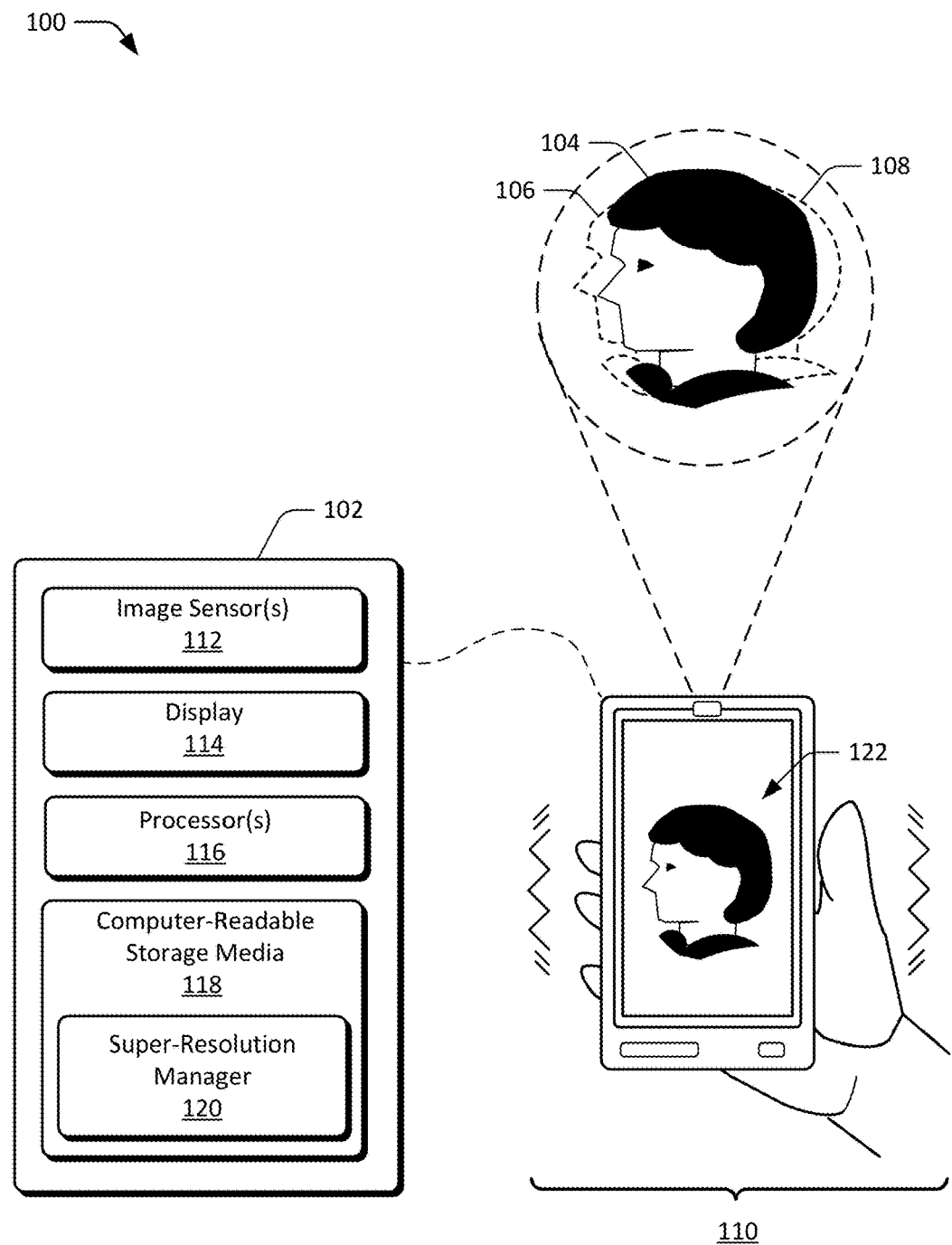
FIG. 1 illustrates an example operating environment in which various aspects of super-resolution using natural handheld motion applied to a user device are performed.

FIG. 1 illustrates an example operating environment 100 in which various aspects of super-resolution using natural handheld motion 110 applied to a user device 102 are performed. As illustrated, a user device 102 is capturing variations (104, 106, and 108) of an image of a scene that correspond to multiple frames of the image of the scene. Although illustrated as a smartphone, the user device 102 may be another type of device that has image-capture capabilities, such as a tablet or a dedicated camera.

The variations 104-108 of the image of the scene, captured in a burst sequence by the user device 102, include sub-pixel offsets that are a result of a natural handheld-motion 110 applied to the user device 102 while the user device 102 is capturing the image of the scene. The natural handheld-motion 110 may be caused, for example, by a hand-tremor of a user of the user device 102 that induces an in-plane motion, an out-of-plane motion, a pitch, a yaw, or a roll to the user device 102 while the user device 102 is capturing the variations 104-108 of the image of the scene.

In some instances, and as an alternative to the sub-pixel offsets resulting from the natural handheld-motion 110, the sub-pixel offsets may result from another motion applied to the user device 102, such as a haptic motion induced by a vibrating mechanism that is in contact with (or integrated with) the user device 102 or a vibration that is induced while the user device 102 is transported within the operating environment 100 (e.g., the user device 102 may be in motion in a vehicle, moved by the user, and so on).

The user device 102 includes a combination of one or more image sensor(s) 112 for capturing an image. The image sensor 112 may include a complementary metal-oxide semiconductor (CMOS) image sensor or a charge-coupled device (CCD) image sensor. In some instances, the image sensor 112 may include a color filter array (CFA) that overlays pixels of the image sensor 112 and limits intensities, as associated with color wavelengths, of light recorded through the pixels. An example of such a CFA is a Bayer CFA, which filters light according to a red wavelength, a blue wavelength, and a green wavelength. In an instance of multiples of the image sensor 112 (e.g., a combination of more than one image sensor, such as a dual image sensor), the multiples of the image sensor 112 may include combinations of pixel densities (e.g., 40 megapixel (MP), 32 MP, 16 MP, 8 MP) as well as different CFA configurations to support different image processing needs (e.g., inclusion of a Bayer CFA to support red green blue (RGB) image processing, exclusion of a CFA to support monochromatic-image processing). Light from images, when filtered through the Bayer CFA, may generate an image that can be referred to as a Bayer image or a Bayer frame.

The user device 102 also includes a display 114 for rendering the image. In some instances, the display 114 may be a touchscreen display. The user device 102 also includes a combination of one or more processor(s) 116. The processor 116 may be a single core processor or a multiple core processor composed of a variety of materials, such as silicon, polysilicon, high-K dielectric, copper, and so on. In an instance of multiples of the processor 116 (e.g., a combination of more than one processor), the multiples of processor 116 may include a central processing unit (CPU), a graphics processing unit (GPU), a digital signal processor (DSP), or an image processing unit (IPU). Furthermore, and in such an instance, the multiples of the processor 116 may perform two or more computing operations using pipeline-processing.

The user device 102 also includes computer-readable storage media (CRM) 118 that includes executable instructions in the form of a super-resolution manager 120. The CRM 118 described herein excludes propagating signals. The CRM 118 may include any suitable memory or storage device such as random-access memory (RAM), static RAM (SRAM), dynamic RAM (DRAM), non-volatile RAM (NVRAM), read-only memory (ROM), or Flash memory useable to store the super-resolution manager 120.

Code or instructions of the super-resolution manager 120 may be executed, using the processor 116, to cause the user device 102 to perform operations directed to creating (and rendering) a super-resolution image 122 of the scene. Such operations may include capturing, using the image sensor 112, multiple frames of an image of a scene (e.g., the variations (104, 106, and 108) of the image of the scene) using the image sensor 112. The operations may further include the user device 102 (e.g., the processor 116) performing super-resolution computations, accumulating color planes, combining the accumulated color planes to create a super-resolution image 122 of the scene, and rendering (e.g., through the display 114) the super-resolution image 122 of the scene. The super-resolution image 122 of the scene, in general, has a resolution that is higher over another resolution of the multiple frames of the image of the scene.

Figure 2:
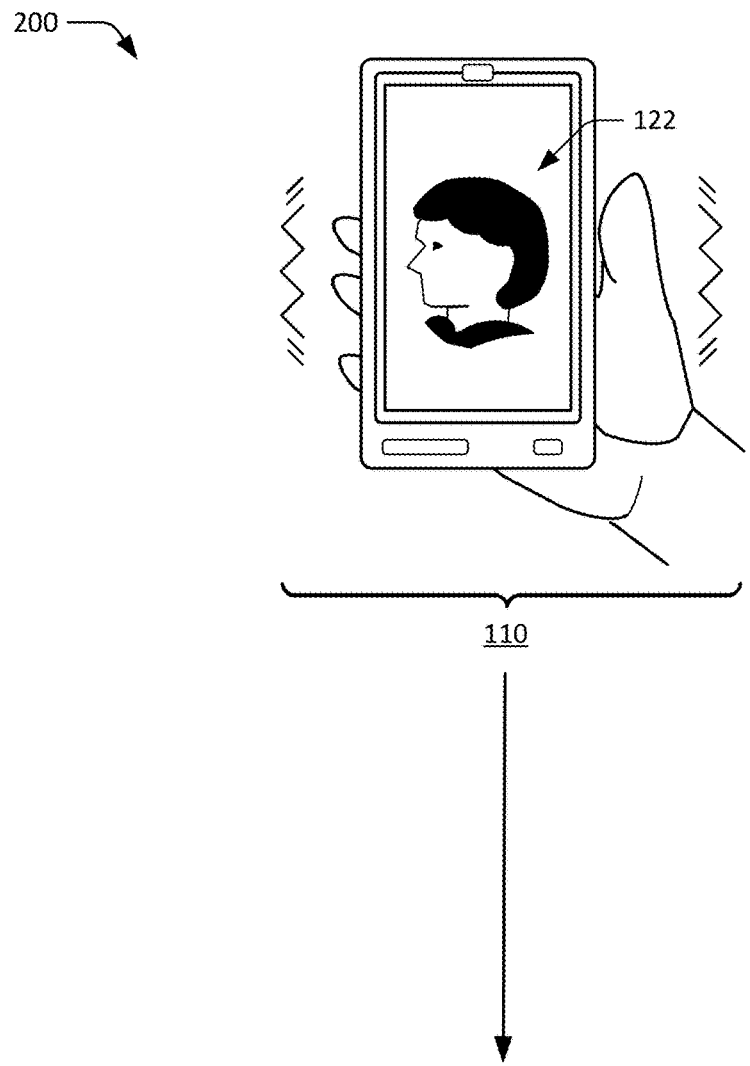
FIG. 2 illustrates example aspects of multiple frames having sub-pixel offsets.
Figure 2:
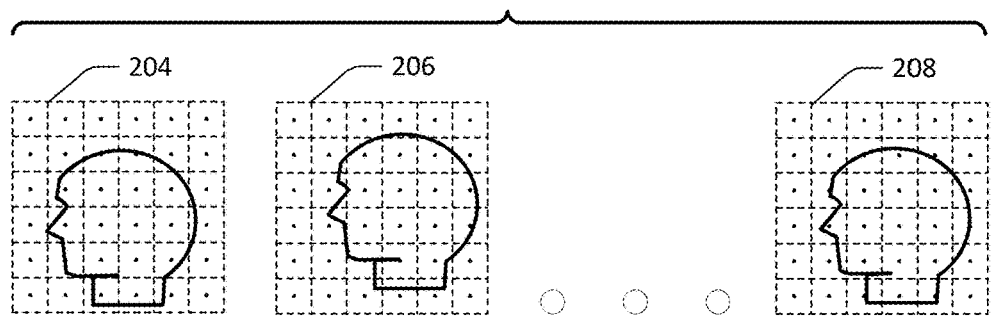

FIG. 2 illustrates example aspects of multiple frames having sub-pixel offsets. In some instances, the multiple frames having sub-pixel offsets may be introduced by a motion applied to the user device 102 in FIG. 1. In some instances, the motion of the user device 102 corresponds to the natural handheld-motion 110 made by a user of the user device 102 during the burst sequence.

As illustrated in FIG. 2, multiple frames 202 have respective, relative sub-pixel offsets of an image and include frame 204, frame 206, and frame 208 (frames 204-208 correspond to variations 104-108 of FIG. 1). The multiple frames 202 serve as a basis for computing and forming the super-resolution image 122. The user device 102 may capture the multiple frames 202, using a resolution that is lower than another resolution of the super-resolution image 122 of the scene, during the burst sequence.

The burst sequence may include capturing the multiple frames 202 at a set time interval that may range, for example, from one millisecond to three milliseconds, one millisecond to five milliseconds, or one-half millisecond to ten milliseconds. Furthermore, and in some instances, the time interval of the burst sequence may be variable based on a motion of the user device (e.g., a time interval may be "shorter" during a high-velocity motion of the user device 102 than another time interval during a low-velocity motion of the user device 102 to keep the offsets at less than one pixel).

As illustrated, the image of frame 206 is respectively offset, relative to the image of frame 204, one half-pixel horizontally and one half-pixel vertically. Furthermore, and as illustrated, the image of frame 208 is respectively offset, relative to the image of frame 204, one-quarter pixel horizontally. Respectively, relative sub-pixel offsets can include different magnitudes and combinations of sub-pixel offsets (e.g., one sub-pixel offset associated with one frame might be one-quarter pixel horizontally and three-quarters of a pixel vertically, while another sub-pixel offset that is associated with another frame might be zero pixels horizontally and one-half of a pixel vertically). In general, the techniques and systems described by this present disclosure can accommodate sub-pixel offsets that are more random than the illustrations and descriptions of frames 204-208, including sub-pixel offsets that are non-linear.

Figure 3:
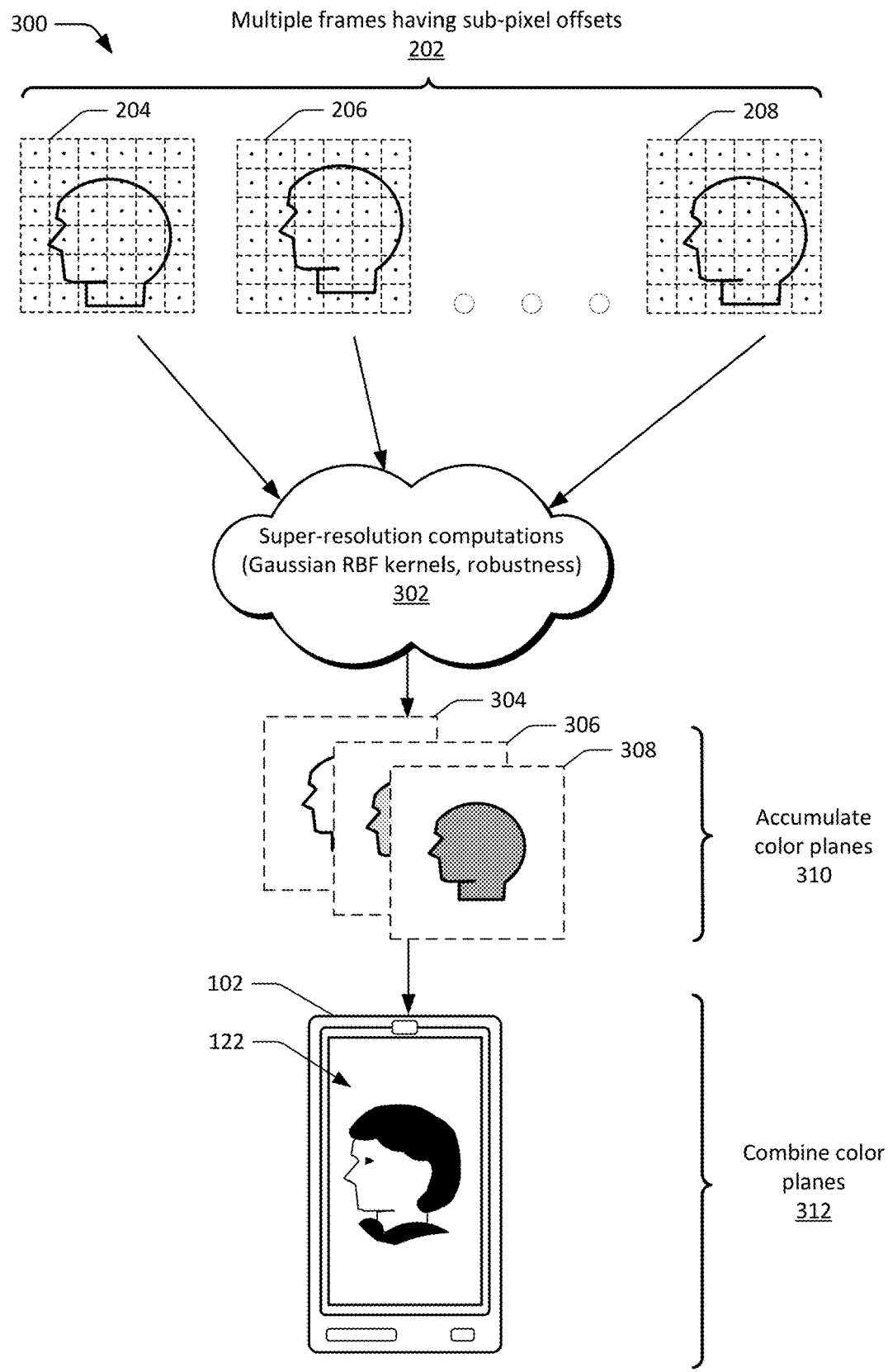
FIG. 3 illustrates example aspects of using multiple frames having sub-pixel offsets to perform computations, accumulate color planes, and combine color planes.

FIG. 3 illustrates example aspects 300 of using multiple frames having sub-pixel offsets to perform computations, accumulate color planes, and combine color planes in accordance with one or more aspects. The example aspects 300 may use elements of FIG. 1 and FIG. 2, wherein performing computations, accumulating the color planes, and combining the color planes are performed by the user device 102 of FIG. 1 and the multiple frames having the sub-pixel offsets are the multiple frames 202 of FIG. 2.

As illustrated in FIG. 3, the multiple frames 202 are input to super-resolution computations 302. The super-resolution computations 302 include Gaussian radial basis function (RBF) kernel computations (inspired by fluid particle rendering) and robustness model computations. Algorithms that support the super-resolution computations 302 may reside in the super-resolution manager 120 of the user device 102. Furthermore, the user device 102 (e.g., multiples of the processor 116) may perform portions of super-resolution computations 302 using pipeline-processing. The combination of the Gaussian RBF kernel computations (e.g., a kernel regression technique), along with weighting from the robustness computations, provides a means of determining contributions of pixels to color planes.

In support of the Gaussian RBF kernel computations, the user device 102 filters pixel signals from each frame of the multiple frames 202 to generate respective color-specific image planes corresponding to color channels. The user device 102 then aligns the respective color-specific image planes to a reference frame. In some instances, the reference frame may be formed through creating red/green/blue (RGB) pixels corresponding to Bayer quads by taking red and blue values directly and averaging green values together.

The user device 102 then computes a covariance matrix. Computing the covariance matrix may include analyzing local gradient structure tensors for content of the reference frame (e.g., a local tensor may be local to an edge, a corner, or a textured area contained within the reference frame). Using the covariance matrix, the user device 102 can compute the Gaussian RBF kernels.

Computing the covariance matrix may rely on the following mathematical relationship:

$$\Omega = \begin{bmatrix} e_1 & e_2 \end{bmatrix} \begin{bmatrix} k_1 & 0 \\ 0 & k_2 \end{bmatrix} \quad (1)$$

In mathematical relationship (1), $\Omega$ represents a kernel covariance matrix, $e_1$ and $e_2$ represent orthogonal direction vectors and two associated eigenvalues $\lambda_1$ and $\lambda_2$, and $k_1$ and $k_2$ control a desired kernel variance.

Computing the local gradient structure tensors may rely on the following mathematical relationship:

$$\hat{\Omega} = \begin{bmatrix} I_x^2 & I_x I_y \\ I_x I_y & I_y^2 \end{bmatrix} \quad (2)$$

In mathematical relationship (2), $I_x$ and $I_y$ represent local image gradients in horizontal and vertical directions, respectively.

In support of the mentioned robustness model computations, the user device 102 may use a statistical neighborhood model to formulate probabilities of pixels contributing to a super-resolution image (e.g., pixels from the multiple frames 202 contributing to the super-resolution image 122 of the scene. The statistical neighborhood model may analyze local statistics such as a mean, a variance, or a Bayer pattern local quad green channel disparity difference to form a model that predicts aliasing (e.g., pixel signaling with frequency content above half of a sampling rate that manifests as a lower frequency after sampling).

The robustness model computations, in some instances, may include denoising computations to compensate for color differences. The denoising computations may, in some instances, rely on a spatial color standard deviation or a mean difference between frames.

Additional or alternative techniques may also be included in the super-resolution computations 302. For example, the super-resolution computations 302 may include analyzing downscaling operations to find regions of an image that cannot be aligned correctly. As another example, the super-resolution computations 302 may include detecting characteristic patterns to mitigate misalignment artifacts. In such an instance, signal gradient pattern analysis may detect artifacts such as "checkerboard" artifacts.

The super-resolution computations 302 are effective to estimate, for each of the multiple frames 202 (e.g., for frame 204, 206, and 208), the contribution of pixels to color channels associated with respective color planes, e.g., a first color plane 304 (which may be a red color plane associated to a red color channel), a second color plane 306 (which may be a blue color plane associated to a blue color channel), and a third color plane 308 (which may be a green color plane associated to a green color channel). The super-resolution computations 302 treat the pixels as separate signals and accumulate the color planes simultaneously.

Also, and as illustrated in FIG. 3, a color plane accumulation operation 310 accumulates the color planes 304-308. Accumulation of the color planes 304-308 may include normalization computations that rely on the following mathematical relationship:

$$C(x, y) = \frac{\sum_n \sum_i c_{n,i} \cdot w_{n,i} \cdot \hat{R}_n}{\sum_n \sum_i w_{n,i} \cdot \hat{R}_n} \quad (3)$$

In mathematical relationship (3), x and y represent pixel coordinates, the sum $\Sigma_n$ operates over (or is a sum of) contributing frames, the sum $\Sigma_i$ is a sum of samples within a local neighborhood, $c_{n,i}$ represents a value of a Bayer pixel at a given frame n and sample i, $w_{n,i}$ represents a local sample weight, and $\hat{R}_n$ represents a local robustness.

FIG. 3 also illustrates a combining operation 312 that creates the super-resolution image 122 of the scene. The user device 102 may then render the super-resolution image 122 of the scene on the display 114 of the user device 102 (as illustrated) or, alternatively, store the super-resolution image 122 of the scene in the CRM 118 of the user device 102. As described above, and as part of the super-resolution computations 302, the user device 102 filters pixel signals from each frame of the multiple frames 202 to generate color-specific image planes corresponding to color channels. Each color-specific image plane may be a representation of the image, filtered to a specific color channel (e.g., a red image plane, a blue image plane, and a green image plane). The user device 102 then aligns the respective color-specific image planes to a reference frame.

Figure 4:
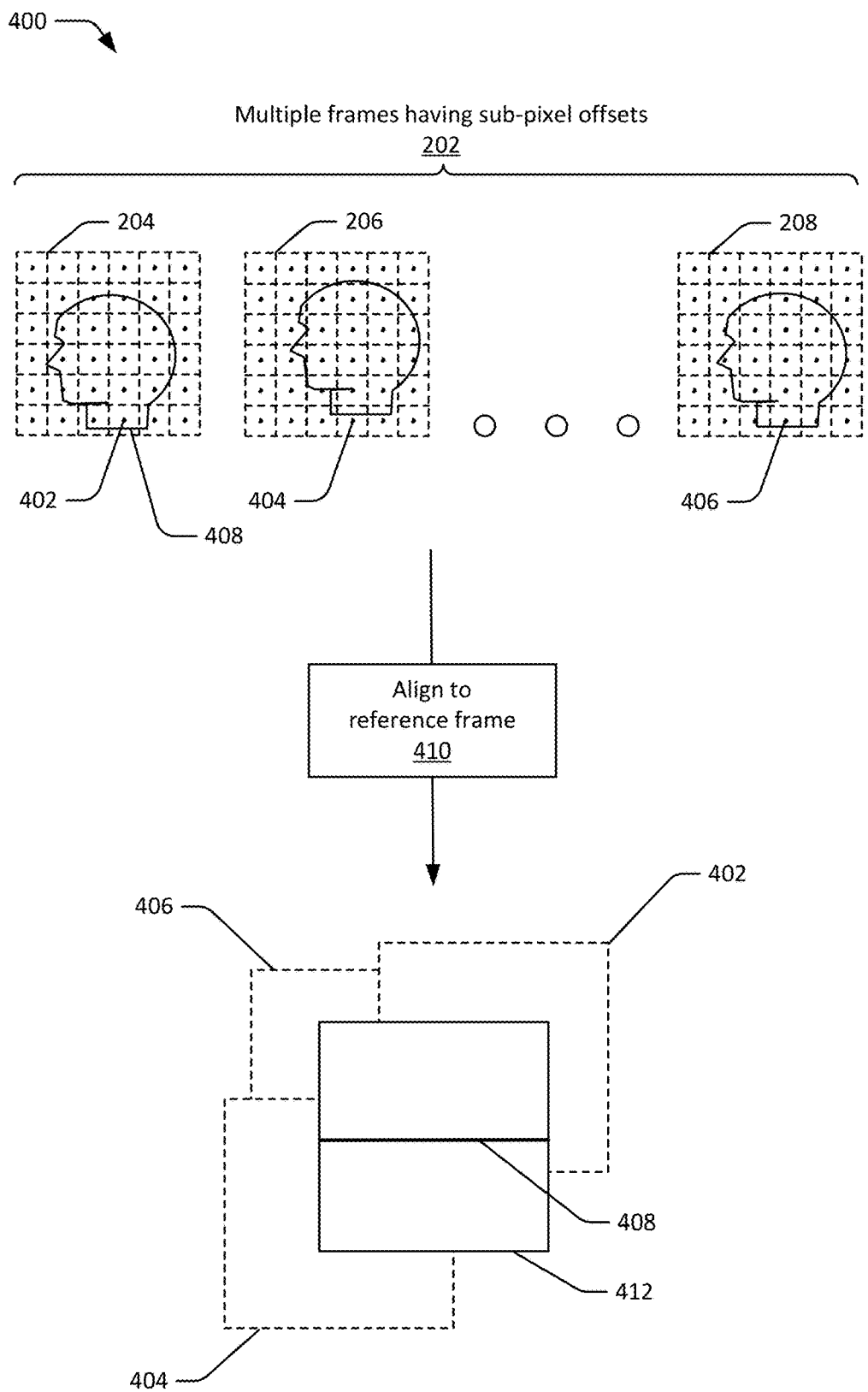
FIG. 4 illustrates example aspects of aligning multiple frames having sub-pixel offsets to a reference frame.

FIG. 4 illustrates example aspects 400 associated with aligning multiple frames having sub-pixel offsets to a reference frame. As illustrated in FIG. 4, each of the multiple frames 202 (e.g., frame 204, 206, and 208) are comprised of multiple pixels (e.g., representative pixels 402, 404, and 406, respectively). Each pixel corresponds to content 408 of the image (e.g., an edge, a corner, or a textured area of content of the image).

With respect to FIG. 4 and at 410, aligning the multiple frames 202 having sub-pixel offsets to a reference frame includes aligning color-specific image planes (e.g., the multiple frames 202 filtered according to a red wavelength, a blue wavelength, or a green wavelength) such that the corresponding content 408 of each pixel of the multiple frames 202 aligns to corresponding content of pixel 412 of the reference frame. (Note: FIG. 4 is not drawn to scale and is simplified for descriptive purposes; in actuality, and depending on resolution capabilities of the user device 102, the corresponding content 408 may consume, or nearly consume, an entire pixel). For each pixel 402-406, the contribution of the content 408 to a color channel may be quantified through tensor analysis (e.g., analysis of a local gradient structure tensor quantifies the contribution of the content 408 of each pixel 402-406 to each color channel).

The elements described by FIGS. 1-4 support creating the super-resolution image of the scene while addressing multiple aspects of photography. In addition to providing the super-resolution image of the scene without the previously mentioned, detrimental artifacts of demosaicing (e.g., low image-resolution, chromatic aliasing, false gradients, and Moiré patterns), FIGS. 1-4 describe elements that are compatible with a single shutter press (e.g., a single image capture command), that can be used without a tripod or deliberate motion, and that produce the super-resolution image with low latency (e.g., within at most a few seconds). Furthermore, the elements are robust to motion within a scene, scene changes, and low-light conditions.

Example Methods

Example methods 500 and 600 are described with reference to FIGS. 5 and 6 in accordance with one or more aspects associated with creating a super-resolution image of a scene captured by a user device. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-Specific Integrated Circuits (ASICs), Application-Specific Standard Products (ASSPs), System-on-a-Chip systems (SoCs), or Complex Programmable Logic Devices (CPLDs).

Figure 5:
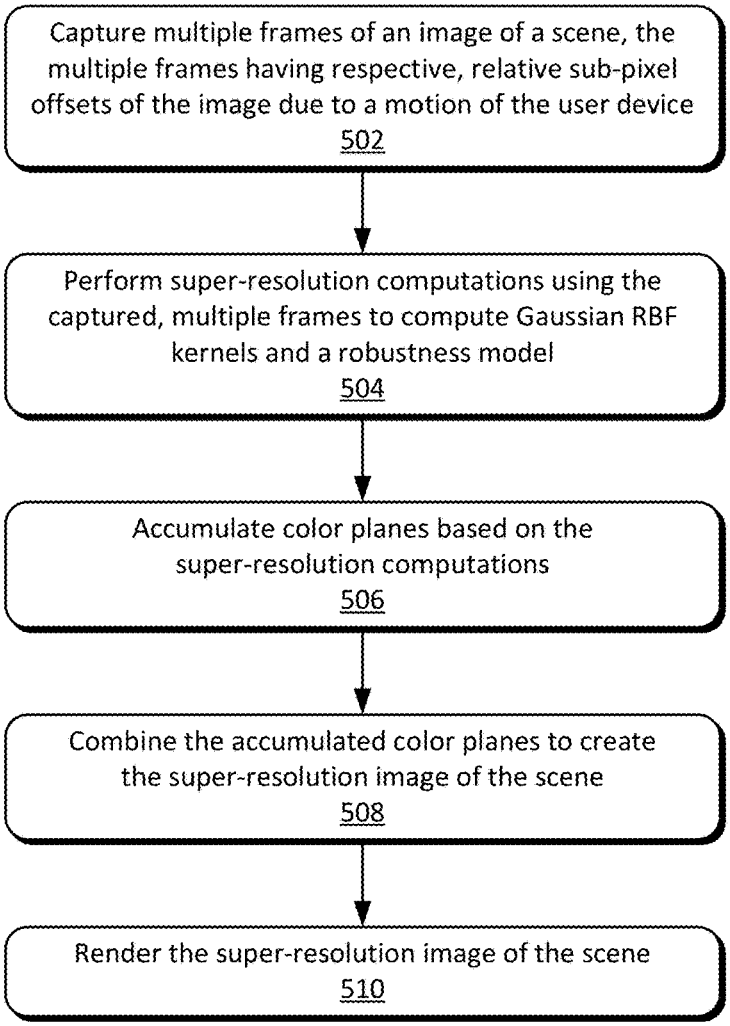
FIG. 5. illustrates an example method used to render a super-resolution image.

FIG. 5 illustrates example aspects of a method 500 used as part of creating a super-resolution image of a scene. The method 500 is described in the form of a set of blocks 502-510 that specify operations that can be performed. However, operations are not necessarily limited to the order shown in FIG. 5 or described herein, for the operations may be implemented in alternative orders, in fully or partially overlapping manners, or in iterative fashions. Furthermore, although the operations represented by the method 500 will be described in the context of being performed by the user device 102 of FIG. 1, the operations (or portions of the operations) may be performed by one or more other devices having computational capabilities, such as a server or a cloud-computing device including instructions (or portions of instructions) of the super-resolution manager 120.

At block 502 the user device 102 (e.g., the image sensor 112) captures, in a burst sequence, multiple frames 202 of an image of a scene, where the multiple frames 202 have respective, relative sub-pixel offsets of the image due to a motion of the user device during the capturing of the multiple frames. In some instances, the motion of the user device may correspond to a natural handheld-motion 110 made by a user of the user device. In other instances, the motion of the user device may correspond to a displacement induced by a vibrating mechanism that is in contact with, or part of, the user device 102.

At block 504, the user device (e.g., the processor 116 executing the instructions of the super-resolution manager 120) performs super-resolution computations 302. Performing the super-resolution computations 302 uses the captured, multiple frames to compute Gaussian radial basis function kernels and compute a robustness model. Computing the Gaussian radial basis function kernels may include multiple aspects, inclusive of filtering pixel signals from each of the multiple frames to generate color-specific image planes for respective color channels and aligning the color-specific image planes to a reference frame. In addition to corresponding to red, green and blue color channels, the color-specific image planes may also correspond to chromatic color channels (e.g., shades of black, white, and grey) or other color-channels such as cyan, violet, and so on.

Computing the Gaussian radial basis function kernels may also include computing a kernel covariance matrix (e.g., mathematical relationship (1)) based on analyzing local gradient structure tensors (e.g., mathematical relationship (2)) generated by aligning the color-specific image planes to the reference frame. In such instances, the local gradient structure tensors may correspond to edges, corners, or textured areas of content included in the reference frame. Furthermore, and also as part of block 504, computing the robustness may include using a statistical neighborhood model to compute, for each pixel, a color mean and spatial standard deviation.

At block 506, the user device 102 (e.g., the processor 116 executing the instructions of the super-resolution manager 120) accumulates color planes based on the super-resolution computations 302 of block 504. Accumulating the color plane may include the user device performing computations (e.g., mathematical relationship (1)) that, for each color channel, normalize pixel contributions (e.g., normalize contributions of each pixel, of the multiple frames captured at block 502, to each color channel).

At block 508, the user device 102 combines the accumulated color planes to create the super-resolution image 122 of the scene. At block 510, the user device 102 (e.g., the display 114) renders the super-resolution image 122 of the scene.

Although the example method 500 of FIG. 5 is described in the context of being performed by the user device 102 of FIG. 1, operations within the example method 500 (or portions of the operations) may be performed by one or more other devices having computational capabilities, such as a server or a cloud-computing device including instructions (or portions of instructions) of the super-resolution manager 120. For example, the user device 102 may capture the multiple frames of the image of the scene (e.g., block 502) and transmit or share the multiple frames with a server or cloud-computing device. Such a server or cloud-computing device may perform the super-resolution computations (e.g., blocks 504 and 506), accumulate the color planes (e.g., block 508) and transmit, back to the user device 102, the super-resolution image of the scene.

Figure 6:
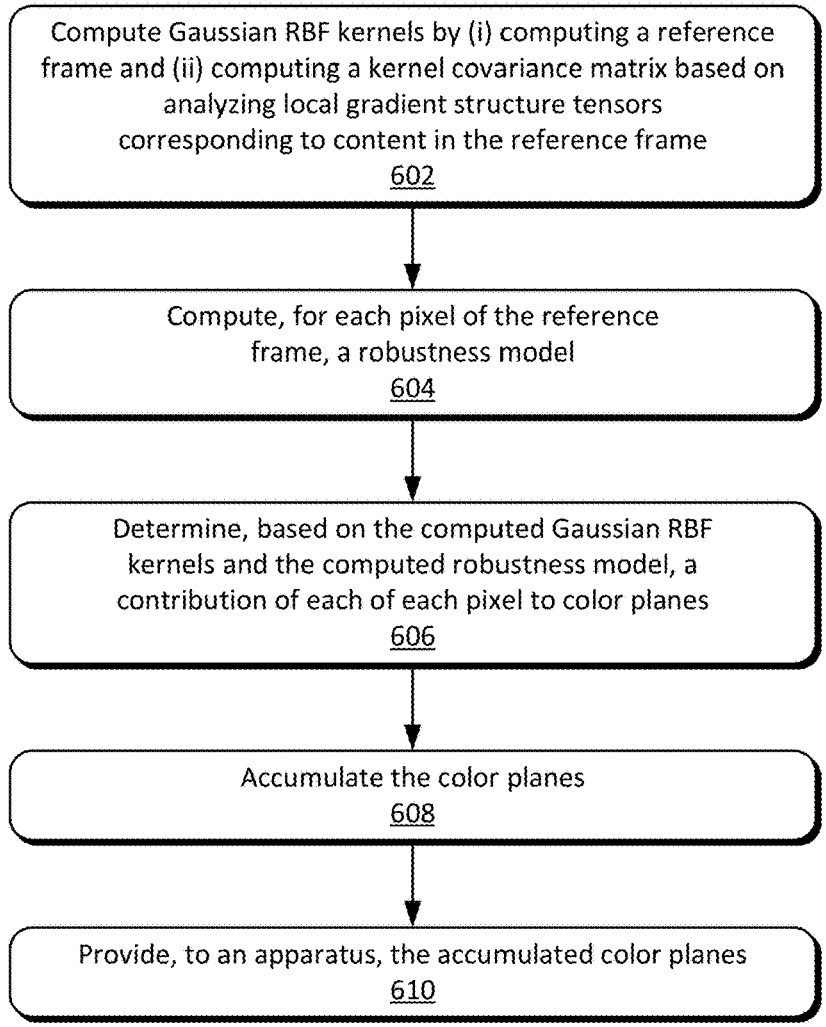
FIG. 6 illustrates an example method used to accumulate color planes for a super-resolution image.

FIG. 6 illustrates example aspects of a method 600 directed to providing color planes to an apparatus. The method 600 is described in the form of a set of blocks 602-610 that specify operations that can be performed. However, operations are not necessarily limited to the order shown in FIG. 6 or described herein, for the operations may be implemented in alternative orders, in fully or partially overlapping manners, or in iterative fashions. Furthermore, the operations of the method 600 may be performed by the user device 102 of FIG. 1.

At block 602, the user device 102 (e.g., the processor 116 executing the instructions of the super-resolution manager 120) computes Gaussian Radial Basis Function (RBF) kernels. Computing the Gaussian RBF kernels includes several aspects, including selecting a reference frame and computing a covariance matrix.

Computing the kernel covariance matrix (e.g., mathematical relationship (1)) is based on analyzing local gradient structure tensors (e.g., mathematical relationship (2)), where the local gradient structure tensors correspond to edges, corners, or textured areas of content included in the reference frame.

In some instances, at block 602, the multiple frames of the image of the scene 202 may have respective, relative sub-pixel offsets of the image across the multiple frames due to a motion of an image-capture device during the capture of the multiple frames 202. Furthermore, and in some instances, the motion of the image-capture device may correspond to a motion made by a user of the image-capture device. The motion, in some instances, may correspond to a natural handheld motion.

At block 604, the user device 102 computes a robustness model. Computing the robustness model includes using a statistical neighborhood model to a color mean and a spatial standard deviation.

At block 606 the user device 102 determines color planes. The user device 102 may base the determination on the computed Gaussian radial basis function kernels and the computed robustness model, determining the contribution of each pixel to the color planes.

At block 608, the user device 102 accumulates the color planes. Accumulating the color planes may include normalization computations (e.g., using mathematical relationship (1)).

At block 610, the user device 102 provides, to the apparatus, the color planes. In some instances, providing the color planes to the apparatus includes providing the color planes to the apparatus for storage (e.g., storage in a computer-readable media of the apparatus). In other instances, providing the color planes to the apparatus includes providing the color planes to the apparatus for combining the color planes and rendering the color planes.

Although systems and methods of super-resolution using handheld motion applied to a user device have been described in language specific to features and/or methods, it is to be understood that the subject of the appended claims is not necessarily limited to the specific features or methods described. Rather, the specific features and methods are disclosed as example ways in which super-resolution using handheld motion applied to a user device can be implemented.

Variations to systems and methods of super-resolution using handheld motion applied to a user device, as described, are many. As a first example variation, super-resolution computations may generate (and accumulate) depth maps or other planes that are not associated with a specific color. As a second example variation, super-resolution computations may rely on sampling patterns that are other than Gaussian RBF sampling patterns. As a third example variation, super-resolution computations may rely on offsets corresponding to displacement fields instead of sub-pixel offsets. And, as a fourth example variation, super resolution-computations may rely on motion that is not induced through handheld movement (e.g., small motions of an image may generate necessary sub-pixel offsets or displacements to perform the super-resolution computations).

Further to the descriptions above, a user may be provided with controls allowing the user to make an election as to both if and when systems, programs or features described herein may enable collection of user information (e.g., images captured by a user, super-resolution images computed by a system, information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In the following, several examples are described.

Example 1: A method used to render a super-resolution image of a scene, the method performed by a user device and comprising: capturing, in a burst sequence, multiple frames of an image of a scene, the multiple frames having respective, relative sub-pixel offsets of the image due to a motion of the user device during the capturing of the multiple frames; performing super-resolution computations using the captured, multiple frames, the super-resolution computations including: computing Gaussian radial basis function kernels; and computing a robustness model; accumulating, based on the super-resolution computations, color planes; combining the accumulated color planes to create the super-resolution image of the scene; and rendering the super-resolution image of the scene.

Example 2: The method as recited by example 1, wherein performing the super-resolution computations determines contributions of pixels of the multiple frames of the image of the scene to the color planes.

Example 3: The method as recited by example 1 or 2, wherein the motion of the user device corresponds to a natural handheld-motion made by a user of the user device during the burst sequence.

Example 4: The method as recited by any of examples 1-3, wherein performing the super-resolution computations includes filtering pixel signals from each of the multiple frames to generate color-specific image planes for respective color channels.

Example 5: The method as recited by example 4, wherein performing the super-resolution computations includes aligning the color-specific image planes to a reference frame.

Example 6: The method as recited by any of examples 4-5, wherein the respective color channels correspond to a red color channel, a blue color channel, and a green color channel.

Example 7: The method as recited by any of examples 5-6, wherein computing the Gaussian radial basis function kernels includes computing a kernel covariance matrix based on analyzing local gradient structure tensors of color-specific image planes aligned to the reference frame.

Example 8: The method as recited by any of examples 1-7, wherein the local gradient structure tensors correspond to edges, corners, or textured areas of content included in the reference frame.

Example 9: The method as recited by any of examples 1-8, wherein computing the robustness model uses a statistical neighborhood model to compute a spatial color standard deviation or a mean difference.

Example 10: A method of providing color planes to an apparatus, the method comprising: computing Gaussian radial basis function kernels, wherein computing the Gaussian radial basis function kernels includes: selecting a reference frame; and computing a kernel covariance matrix based on analyzing local gradient structure tensors, the local gradient structure tensors corresponding to edges, corners, or textured areas of content included in the reference frame; and computing a robustness model, wherein computing the robustness model includes using a statistical neighborhood model to compute a color mean and spatial standard deviation; determining, based on the computed Gaussian radial basis function kernels and the computed robustness model, contributions of pixels to color planes; accumulating the color planes; and providing, to the apparatus, the accumulated color planes.

Example 11: The method as recited by example 10, wherein providing the accumulated color planes includes providing the accumulated planes to the apparatus to store.

Example 12: The method as recited by example 10 or 11, wherein providing the accumulated color planes to the apparatus includes providing the accumulated color planes to the apparatus to combine and render a super-resolution image.

Example 13: A user device, the user device comprising: one or more image sensors; one or more processors; a display; and a computer-readable medium comprising instructions of a super-resolution manager application that, when executed by the one or more processors, directs the user device to: capture, in a burst sequence using the one or more image sensors, multiple frames of an image of a scene, the multiple frames having respective, relative offsets of the image across the multiple frames; perform, using the one or more processors, super-resolution computations using the captured, multiple frames of the image of the scene; accumulate, using the one or more processors and based on the super-resolution computations, planes; combine, using the one or more processors, the accumulated planes to create a super-resolution image of the scene; and render, using the display, the super-resolution image of the scene.

Example 14: The user device as recited by example 13, wherein the one or more processors are multiple, different processors and include a central processing unit, an image processing unit, a digital signal processor, or a graphics processing unit.

Example 15: The user device as recited by example 13 or 14, wherein the one or more processors that are the multiple, different processors, perform the super-resolution computations using pipeline-processing.

Example 16: A system comprising a means for performing any of the methods as recited by examples 1-9.

Example 17: A system comprising a means for performing any of the methods as recited by examples 10-12.

Example 19: A computer-readable storage medium including instructions that, when executed, configure a processor to perform any of the methods as recited by any of examples 1-9.

Example 20: A computer-readable storage medium including instructions that, when executed, configure a processor to perform any of the methods as recited by any of examples 10-12.

Example 21: A user device configured to perform the method as recited by any of examples 1-9.

Example 22: A user device configured to perform the method as recited by any of examples 10-12.

What is claimed is:

1. A method used to render a super-resolution image of a scene, the method performed by a user device and comprising:
capturing, in a burst sequence, multiple frames of an image of a scene, the multiple frames having respective, relative sub-pixel offsets of the image due to a motion of the user device during the capturing of the multiple frames;
performing super-resolution computations using the captured, multiple frames, the super-resolution computations including robustness model computations;
determining, contributions of pixels of the multiple frames to color planes, wherein the contributions of pixels of the multiple frames to the color planes are based on weighted summations of (i) samples of the pixels in local neighborhoods and (ii) a local robustness factor, wherein the local robustness factor is based on the robustness model computations;
accumulating, based on the determined contributions of the pixels to the color planes, the color planes;
combining the accumulated color planes to create the super-resolution image of the scene; and
rendering the super-resolution image of the scene.

2. The method as recited by claim 1, wherein performing the super-resolution computations includes Gaussian radial basis function kernel computations.

3. The method as recited by claim 1, wherein the motion of the user device corresponds to a natural handheld-motion made by a user of the user device during the burst sequence.

4. The method as recited by claim 1, wherein performing the super-resolution computations includes filtering pixel signals from each of the multiple frames to generate color-specific image planes for respective color channels.

5. The method as recited by claim 4, wherein performing the super-resolution computations includes aligning the color-specific image planes to a reference frame.

6. The method as recited by claim 4, wherein the respective color channels correspond to a red color channel, a blue color channel, and a green color channel.

7. The method as recited by claim 2, wherein the Gaussian radial basis function kernel computations include computing a kernel covariance matrix based on analyzing local gradient structure tensors of color-specific image planes aligned to a reference frame.

8. The method as recited by claim 7, wherein the local gradient structure tensors include local gradient structure tensors that correspond to edges included in the reference frame.

9. The method as recited by claim 7, wherein the local gradient structure tensors include local gradient structure tensors that correspond to corners included in the reference frame.

10. The method as recited by claim 7, wherein the local gradient structure tensors include local gradient structure tensors that correspond to textured areas included in the reference frame.

11. The method as recited by claim 1, wherein the robustness model computations use a statistical neighborhood model to compute a spatial color standard deviation.

12. The method as recited by claim 11, wherein the robustness model computations further uses the statistical neighborhood model to compute a mean difference.

13. A method of providing color planes to an apparatus, the method comprising:
computing Gaussian radial basis function kernels, wherein computing the Gaussian radial basis function kernels includes:
computing a reference frame; and
computing a kernel covariance matrix based on analyzing local gradient structure tensors, the local gradient structure tensors corresponding to edges, corners, or textured areas of content included in the reference frame;
computing a robustness model, wherein computing the robustness model includes using a statistical neighborhood model to compute a color mean and spatial standard deviation;
determining, contributions of pixels of multiple frames to color planes, wherein the contributions of pixels of the multiple frames to the color planes are based on weighted summations of (i) samples of the pixels in local neighborhoods and (ii) a local robustness factor, wherein the local robustness factor is based on the robustness model computations;
accumulating, based on the determined contributions of the pixels to the color planes, the color planes; and
providing, to the apparatus, the accumulated color planes.

14. The method as recited by claim 13, wherein providing the accumulated color planes includes providing the accumulated color planes to the apparatus to store.

15. The method as recited by claim 13, wherein providing the accumulated color planes to the apparatus includes providing the accumulated color planes to the apparatus to combine and render a super-resolution image.

16. A user device, the user device comprising:
one or more image sensors;
one or more processors;
a display; and
a computer-readable medium comprising instructions of a super-resolution manager application that, when executed by the one or more processors, directs the user device to:
capture, in a burst sequence using the one or more image sensors, multiple frames of an image of a scene, the multiple frames having respective, relative offsets of the image across the multiple frames;
perform, using the one or more processors, super-resolution computations using the captured, multiple frames, the super-resolution computations including robustness model computations;
determine, using the one or more processors, contributions of pixels of the multiple frames to color planes, wherein the contributions of pixels of the multiple frames to the color planes are based on weighted summations of (i) samples of the pixels in local neighborhoods and (ii) a local robustness factor, wherein the local robustness factor is based on the robustness model computations;
accumulate, using the one or more processors and based on determined contributions of the pixels to the color planes, the color planes;
combine, using the one or more processors, the accumulated color planes to create a super-resolution image of the scene; and
render, using the display, the super-resolution image of the scene.

17. The user device as recited by claim 16, wherein the one or more processors are multiple, different processors and include a central processing unit, an image processing unit, a digital signal processor, or a graphics processing unit.

18. The user device as recited by claim 16, wherein the one or more processors that are the multiple, different processors use pipeline processing to perform the super-resolution computations.

19. The user device as recited by claim 16, wherein the instructions that direct the user device to perform the super-resolution computations include instructions that direct the user device to, as part of the super-resolution computations, perform Gaussian radial basis function kernel computations.

20. The method as recited by claim 1, wherein the super-resolution computations include analyzing downscaling operations or detecting characteristic patterns.

* * * * *